(No Model.)
A. SOMMER.
PROCESS OF DESULFURIZING MINERAL OILS.
No. 523,716.              Patented July 31, 1894.
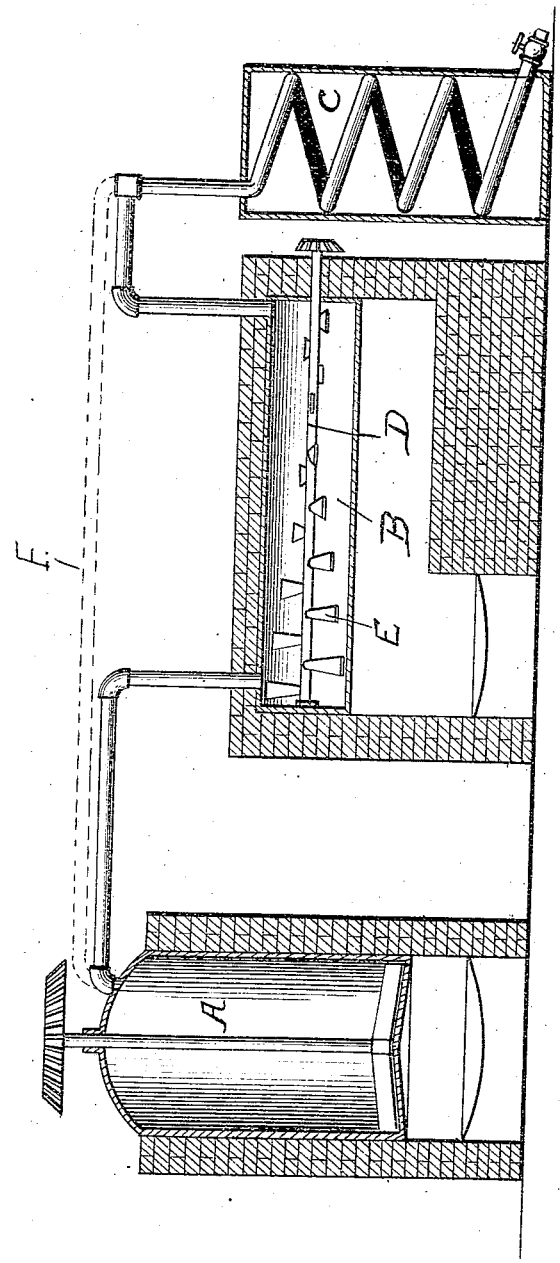
Witnesses
J. M. Fowler Jr.
Thomas Durant
Inventor
Adolph Sommer
By Church & Church
his Attorneys.

UNITED STATES PATENT OFFICE.

ADOLPH SOMMER, OF CAMBRIDGE, MASSACHUSETTS.

PROCESS OF DESULFURIZING MINERAL OILS.

SPECIFICATION forming part of Letters Patent No. 523,716, dated July 31, 1894

Original application filed August 22, 1891, Serial No. 403,426. Divided and this application filed August 15, 1893. Serial No. 483,182. (No specimens.)

*To all whom it may concern:*

Be it known that I, ADOLPH SOMMER, of Cambridge, county of Middlesex, State of Massachusetts, have invented a new and useful Process of Desulfurizing Mineral Oils; and I do hereby declare the following to be a full, clear, and exact description of the same.

In a concurrent application from which this application has been divided, namely, Serial No. 403,426, filed the 22d of August, 1891, and entitled "Process of desulphurizing mineral oils," I have shown how mineral oils in the liquid state can be deprived of their sulphur by digesting them with a copper salt such as the anhydrous sulphate of copper. Now I shall describe a method by which these oils in the form of vapor can be desulphurized. The apparatus in which this is accomplished is shown in the accompanying drawing.

The apparatus A consists of a distilling apparatus A, a desulphurizing chamber B and a condenser C, which parts are connected with each other in the order named. The desulphurizing chamber which may have a cylindrical or any other shape suitable for the purpose, is entirely or partially filled with sulphate of copper in such a manner that vapors can traverse the same readily and in passing through come into intimate contact with the copper salt. The best form of desulphurizing chamber is for most purposes a horizontal cylinder traversed longitudinally by a shaft D provided with numerous blades E. The cylinder is filled only partially with sulphate of copper which during the distillation is energetically stirred by the blades of the revolving shaft.

The oil, either alone or with some sulphate of copper, is placed into the distilling apparatus and the operation conducted in the following manner: The desulphurizing chamber is heated first, and, if it has been filled with crystallized sulphate of copper, there should, simultaneously with the external heating, a current of hot air be passed through the same, until no more steam is given off by the copper salt. When the temperature within the desulphurizing chamber has risen to about 130° centigrade, the distilling apparatus is fired and the vapors allowed to pass through the desulphurizing chamber and finally into the condenser. As the distillation proceeds and the boiling point of the distillate rises, the temperature of the desulphurizing chamber is gradually increased, in order to avoid as much as possible condensation of the vapors in this chamber.

Instead of passing the entire charge in the form of vapor through the desulphurizing chamber, it is often preferable, particularly when a distilled oil is to be desulphurized, to put into the still a quantity of copper salt that is sufficient to desulphurize the oil and to conduct the distillation in such a manner that only the more volatile portion, namely that part which comes off below 150° centigrade, passes through the desulphurizing chamber, while the vapor of the remaining less volatile portion is allowed to pass directly into the condenser by a pipe (F, dotted lines), connecting the top of the still with the upper end of the condenser. After the oil in the still has been completely desulphurized, steam may be introduced to aid in its distillation.

On account of the great difficulty of recovering the copper residue from the coke resulting from distilling crude petroleum to dryness, I generally prefer to apply the herein described treatment to the distillate obtained in the usual manner from the crude oil.

If it is desirable to reduce the quantity of sulphate of copper to the minimum, the above mentioned treatment may be preceded by a treatment with lime, steam or any other substance capable of removing a portion of the sulphur compound.

From the residues of the foregoing operations sulphate of copper is reproduced by roasting, &c., in the manner well known to chemists.

Having thus described my invention, what I claim, and desire to secure by Letters Patent, is—

1. The herein described improvement in the process of desulphurizing mineral oils consisting in volatilizing the same and passing their vapors through a body of anhydrous sulphate of copper, heated to a temperature about or above 130° centigrade; substantially as described.

2. The herein described improvement in the process of desulphurizing mineral oils consisting in distilling them from anhydrous sulphate of copper, and desulphurizing the vapor of that portion which comes off below 150° centigrade by passing the same through a body of anhydrous sulphate of copper, heated to a temperature of about or above 130° centigrade; substantially as described.

ADOLPH SOMMER.

Witnesses:
MANUEL DE FRESTAS,
L. F. CLAR.